United States Patent [19]

Lien et al.

[11] Patent Number: 5,320,443
[45] Date of Patent: Jun. 14, 1994

[54] CONNECTING PIN

[75] Inventors: Douglas E. Lien, Blaine; Roger W. D. Boeckers, Vadnais Heights, both of Minn.

[73] Assignee: Commercial Intertech Corp., Youngstown, Ohio

[21] Appl. No.: 826,803

[22] Filed: Jan. 28, 1992

[51] Int. Cl.⁵ .......................................... F16C 11/10
[52] U.S. Cl. ................... 403/154; 403/79; 403/156; 403/334; 59/86
[58] Field of Search .......... 403/79, 147, 145, 154–157, 403/150, 153, 162, 161, 334, 302, 371; 16/381, 386; 59/86, 88–89

[56] References Cited

U.S. PATENT DOCUMENTS

| | | | |
|---|---|---|---|
| 1,153,986 | 9/1915 | Whitney | 403/147 |
| 1,295,218 | 2/1919 | Shaffer | 403/79 X |
| 1,935,850 | 11/1933 | Lawson | 403/157 |
| 1,943,364 | 1/1934 | Betz | 403/153 X |
| 3,432,214 | 3/1969 | Cashman et al. | 403/156 X |
| 4,022,536 | 5/1977 | Piepho et al. | 403/154 X |
| 4,491,436 | 1/1985 | Easton | 403/154 X |

Primary Examiner—Randolph A. Reese
Assistant Examiner—Harry C. Kim
Attorney, Agent, or Firm—Renner, Kenner, Grieve, Bobak, Taylor & Weber

[57] ABSTRACT

A connector (10, 110) for joining a plurality of elements (15, 20; 115, 120) having attachment apertures (19, 21; 119, 121) therein including, a pin (25; 125, 125') having a radially extending head (27; 127) and a shank (26; 126, 126') extending axially from the head and having a tapering outer surface (29; 129, 129') over at least a portion of the axial extent thereof, a sleeve (35, 135) insertable in the attachment apertures and having a tapering inner surface (38; 138, 138') over at least a portion of the axial extent thereof for engaging the tapering outer surface of the pin, a discontinuity (37, 137) in the sleeve extending at least a portion of the axial extent thereof, and fastener (45, 50; 145, 150) for axially displacing the sleeve relative to the pin selectively to expand and to permit reduction in the diameter of at least a portion of the outer surface of the sleeve.

17 Claims, 3 Drawing Sheets

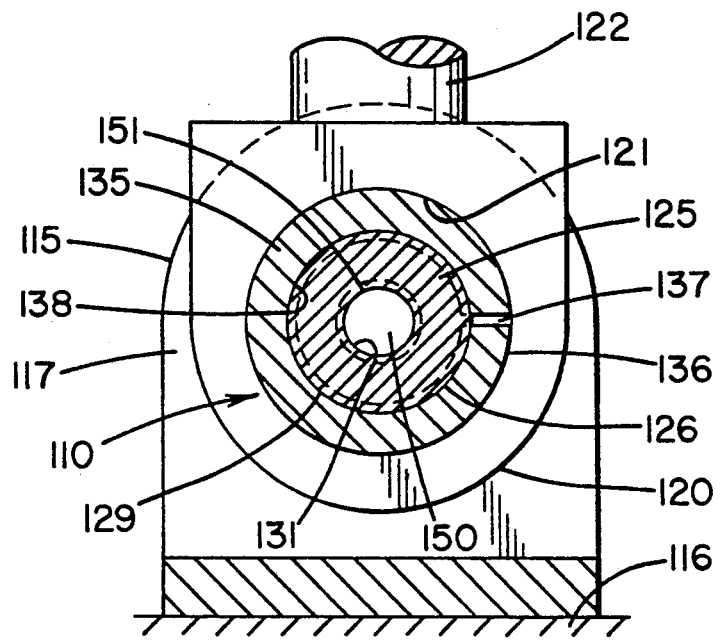
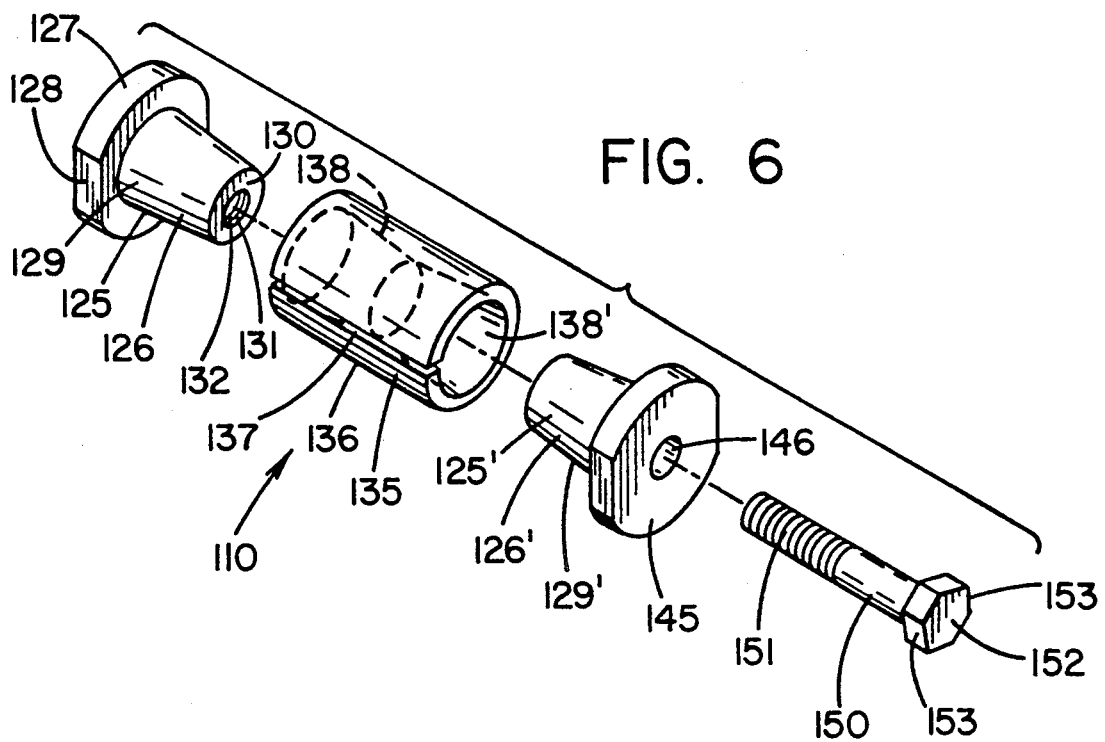

CONNECTING PIN

TECHNICAL FIELD

Generally, the present invention relates to removable coupling devices for joining machinery elements or other apparatus. More particularly, the invention relates to a connecting pin for selectively joining machinery elements or other apparatus. More specifically, the invention relates to a connecting pin for temporarily joining a plurality of machine elements or other members which have attachment apertures to provide a mode of interconnection.

BACKGROUND ART

Connecting pins in the nature of removable coupling devices for joining machinery elements or other apparatus have been known in the art for many years. Such connecting pins are employed for temporarily joining a plurality of machine elements or other members which have attachment apertures to provide a mode of interconnection. Such connecting pins are referred to as pivot pins or a variety of other names, depending upon the particular application involved and terminology which may have evolved in a particular industry.

Classically, such connecting pins extend through the apertures in normally two members for purposes of temporarily joining the members for some type of machine operation where the two machine elements are to operate as a unit. In many such applications, it is necessary to regularly or intermittently decouple the machine elements by removal of the connecting pin. This is necessary, for example, to dismantle the machine elements, replace worn parts, or for other similar reasons.

In a great many applications, it is possible to selectively employ a solid pin to achieve these operational characteristics. Depending upon the particular application, these solid pins may be cylindrical or tapered to facilitate insertion in the attachment apertures of the mating machine elements. Depending upon various considerations such as orientation, load application, and other similar factors, it may be sufficient that such connecting pins are provided with merely a head or collar at one extremity which maintains it in place in the attachment apertures of the particular machine elements. In other instances, it may be necessary to provide the connecting pin with throughbores for receiving cotter pins proximate both extremities thereof, or collects or other fasteners may be employed at one or both ends of the pivot pin to retain the pin in position.

For most applications, it is necessary or desirable that the pin be closely sized to snugly fit in the attachment apertures of the machine elements in order to preclude undesirable movement of the machine elements relative to each other. In applications where a solid connecting pin is only infrequently removed and the machine elements are subject to the outdoors or an otherwise corrosive environment, the pin and/or the attachment apertures of the machine elements may become sufficiently corroded such as to create extreme difficulty in attempting to remove a solid connecting pin.

In many instances, it may be necessary to strike the pin and machine elements in an area in proximity thereto with a hammer or other heavy object to sufficiently free the pin such that it may be removed from the attachment apertures of the machine elements. Not infrequently the pin and/or the machine elements may be damaged merely in the process of effecting removal of the pin in this manner. Although manufacturing the pin and/or the attachment elements of a material that resists corrosion may be possible in some instances, it is not a uniform solution for all applications and can result in excessively expensive parts. While the use of lubricants can be helpful in some circumstances, they are similarly unsatisfactory in all applications and can become essentially ineffectual over an extended time period. Thus, no reliable, inexpensive solution is in use that eliminates the problem of removing solid connecting pins which have become corroded in attachment apertures of machine elements.

DISCLOSURE OF THE INVENTION

Therefore, an object of the present invention is to provide a connecting pin for joining machinery elements having attachment apertures which can be readily removed despite corrosion of the connecting pin, the machine elements, or both, which may develop over a period of time in a corrosive environment. Another object of the present invention is to provide such a connecting pin which can be readily removed even in the presence of substantial corrosive build-up without damage to the connecting pin or the machine elements. A further object of the present invention is to provide such a connecting pin which can be quickly and easily assembled and disassembled in relation to attachment apertures in machine elements.

Another object of the present invention is to provide a connecting pin for joining machine elements having attachment apertures in which the outside diameter of the connecting pin can reduce slightly to permit the connecting pin to be freed from the attachment apertures despite an extent of corrosive build-up. A further object of the present invention is to provide such a connecting pin in which the outside diameter may be slightly expanded after insertion in attachment apertures to snugly engage one or both of the apertures in related machine elements. Yet another object of the present invention is to provide such a connecting pin in which the extent of expansion of the outside diameter can be selectively controlled.

An object of a first embodiment of the present invention is to provide a connecting pin for joining machine elements having attachment apertures employing a tapered pin which matingly engages an interiorly tapered sleeve to radially expand and contract the sleeve upon relative axial movement between the pin and the sleeve. A further object of this embodiment of the present invention is to provide such a connecting pin in which the sleeve has an axial discontinuity to permit radial expansion and contraction thereof. Still another object of this embodiment of the present invention is to provide such a connecting pin in which a detachable collar engages the sleeve, and a fastener extends through the sleeve to threadably engage the pin to effect relative axial movement between the pin and the sleeve.

An object of the second embodiment of the present invention is to provide a connecting pin for joining machine elements having attachment apertures in which a two-piece tapered pin matingly engages an interiorly tapered sleeve to radially expand and contract the sleeve upon relative axial movement between the parts of the pin and the sleeve. A further object of this embodiment of the present invention is to provide a connecting pin wherein the sleeve has a circumferential discontinuity to permit radial expansion and contraction. Still a further object of this embodiment of the invention is to provide such a connecting pin wherein a fastener extends through one of the two parts of the pin and engages a threaded bore in the other part of the pin to effect relative axial movement between the parts of the pin and the sleeve to produce radial expansion and contraction of the sleeve.

Yet another object of the present invention is to provide a connecting pin for machine elements having attachment apertures therein for use in a wide variety of commercial applications. A further object of the present invention is to provide such a connecting pin which can be employed with machine elements having a wide variety of geometric configurations. A still further object of the present invention is to provide such a connecting pin which has provision for assisting in the assembly and disassembly of the connecting pin by the use of standard wrenches. Still a further object of the present invention is to provide such a connecting pin which can be readily fabricated from relatively inexpensive material, yet operate easily and reliably despite adverse environmental conditions.

In general, the present invention contemplates a connector for joining a plurality of elements having attachment apertures therein, including a pin having a radially extending head and a shank extending axially from the head and having a tapering outer surface over at least a portion of the axial extent thereof, a sleeve insertable in the attachment apertures and having a tapering inner surface over at least a portion of the axial extent thereof for engaging the tapering outer surface of the pin, a discontinuity in the sleeve extending at least a portion of the axial extent thereof, and means for axially displacing the sleeve relative to the pin selectively to expand and to permit a reduction in the diameter of at least a portion of the outer surface of the sleeve.

BRIEF DESCRIPTION OF THE DRAWINGS

FIG. 5 is a cross-sectional view taken substantially along the line 5—5 of FIG. 4 showing details of the connecting pin and its interrelation with the machine elements.

FIG. 6 is an exploded view of the connecting pin of FIG. 4 showing the parts oriented for assembly or as positioned when separated during disassembly.

PREFERRED EMBODIMENT FOR CARRYING OUT THE INVENTION

Figure 1:
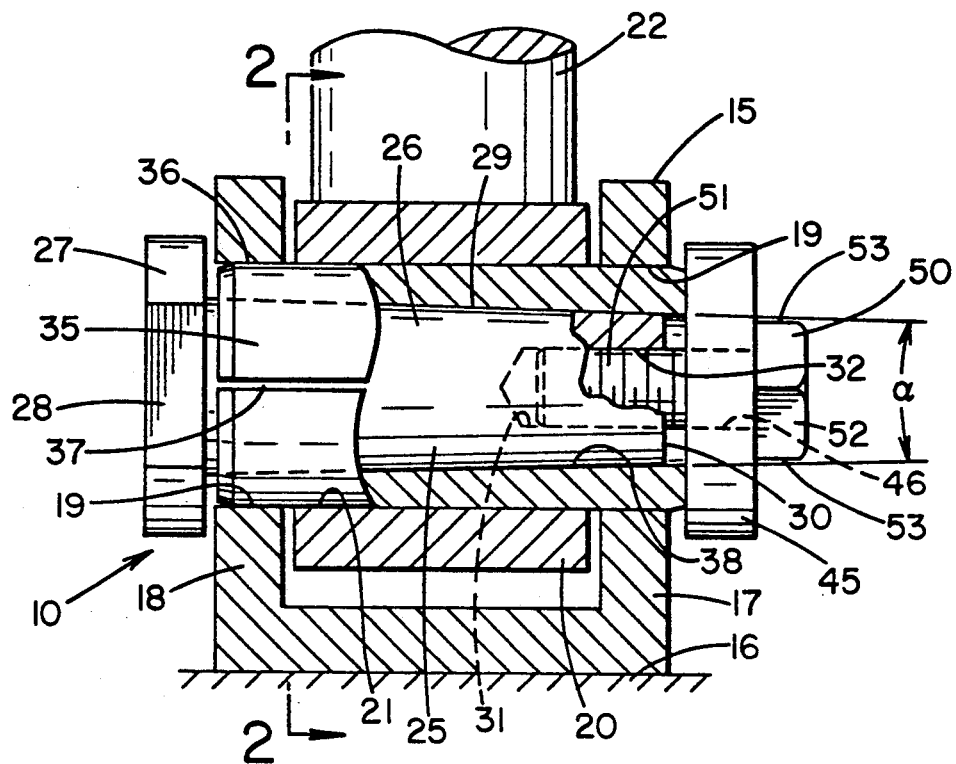
FIG. 1 is a front elevational view of an exemplary connecting pin embodying the concepts of the present invention, with portions broken away and shown in section and illustrated in connection with two machine elements, depicted partially in section, having attachment apertures in which the pin is positioned.
Figure 2:
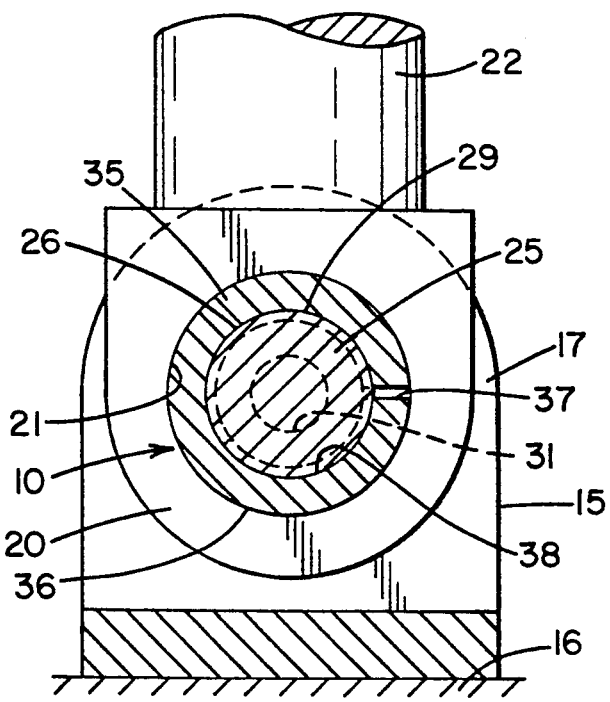
FIG. 2 is a cross-sectional view taken substantially along the line 2—2 of FIG. 1 showing details of the connecting pin and its interrelation with the machine elements.
Figure 3:
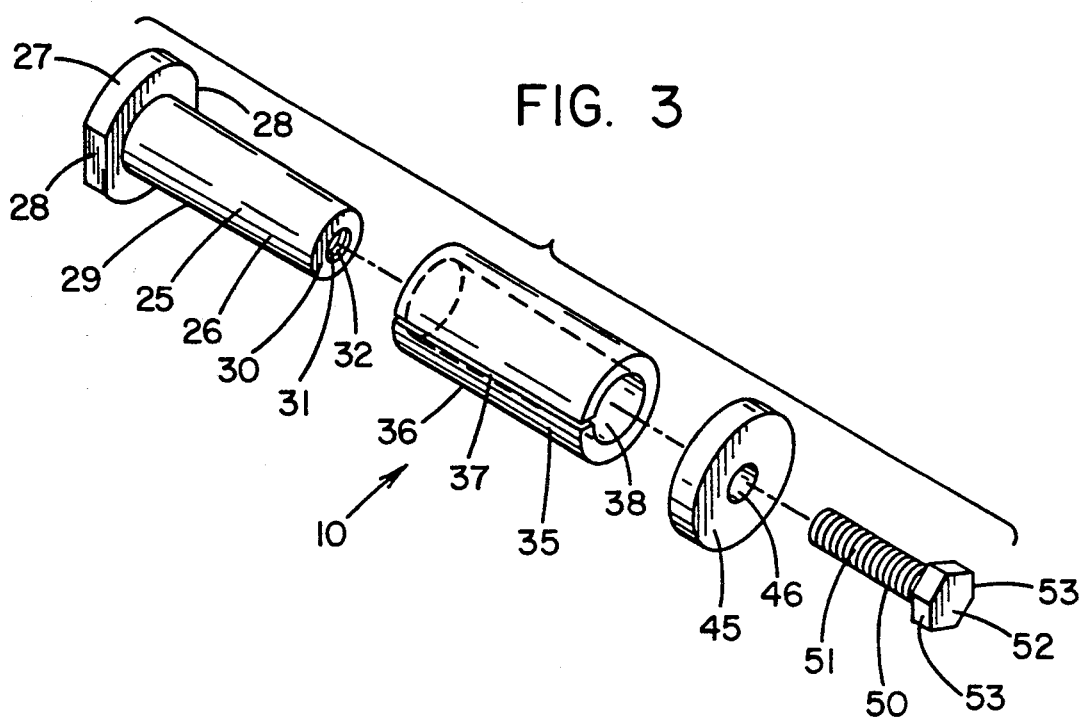
FIG. 3 is an exploded view of the connecting pin of FIG. 1 depicting the parts thereof oriented for assembly or as positioned when separated during disassembly.

A connecting pin according to the concepts of the present invention for use in joining machine elements having attachment apertures and particularly the first embodiment thereof depicted in FIGS. 1-3 of the drawings is generally indicated by the numeral 10. The connecting pin 10 may be employed in conjunction with a wide variety of machine elements wherein each has an aperture, and the members interfit or can be placed in adjacent proximity such that when joined by connecting pin 10 the machine elements are temporarily interconnected to operate as a unitary member.

In the exemplary environment depicted in FIGS. 1-3 of the drawings, there is shown a conventional clevis 15 which may be affixed to other machine elements 16. As seen in FIGS. 1 and 2, the clevis 15 has spaced upstanding legs 17 and 18, with each of the legs being provided with an aperture in the form of a bore 19. As shown, the clevis 15 interrelates with a conventional cylinder eye 20 which has an aperture or bore 21 that is normally of substantially the same diameter as the bore 19 in legs 17, 18 of the clevis 15. As shown, the cylinder eye 20 is attached to a conventional cylinder rod 22, which might be part of a pneumatic or hydraulic cylinder.

The connecting pin 10, in the form depicted in FIGS. 1-3 of the drawings, includes a radially centrally located solid pin 25 having a shank 26 which is of a significantly lesser outside diameter than the diameter of the bores 19 and 21 of the legs 17, 18 and the cylinder eye 20, respectively. The shank 26 is of an axial extent which is preferably substantially equal to or slightly greater than the distance between the outside surfaces of the legs 17, 18 of the clevis 15, as best seen in FIG. 1. As shown, the solid pin 25 has an integrally formed head 27 which is preferably of a larger radial extent or diameter than the shank 26 and the bore 19 in the leg 18 such as to overlie a portion of the outer surface of a leg 18 of clevis 15, as depicted in FIG. 1 of the drawings. The head 27 may be provided with two or more diametrically disposed flats 28 for engagement by a conventional wrench. It will be appreciated by persons skilled in the art that in lieu of the head 27, the solid pin 25 could be provided with a collar or other structure which is affixed longitudinally of the shank 26 of pin 25.

The axial extremity of the solid pin 25 opposite the head 27 has a face 30 with an internal bore 31 which is provided with threads 32 for a purpose which will be detailed hereinafter. As appears from FIGS. 1 and 3 of the drawings, the shank 26 of the solid pin 25 has a tapered outer surface 29 over at least a portion of the axial extent thereof and particularly the entire axial extent as shown. The taper of shank 26 provides a progressively smaller diameter from a position proximate the head 27 to the face 30. The taper of the shank 26 is preferably uniform and preferably approximately at included angle α of substantially six degrees with respect to a cylindrical configuration. Depending upon the application and the configuration of the parts, the taper could vary by employing an included angle α in the range of two to fifteen degrees, depending upon various design considerations which will be apparent to persons skilled in the art.

The connecting pin 10 also includes a sleeve 35 which is configured to over fit the solid pin 25, as particularly shown in FIG. 1 of the drawings. The sleeve 35 has a cylindrical outer surface 36 which is sized to interfit within the bores 19 of legs 17 and 18 of the clevis 15 and the bore 21 in the cylinder eye 20. The sleeve 35 is circumferentially discontinuous over at least a portion of the axial length thereof and, as shown, may have a through slot 37 which extends the entire axial length thereof. The sleeve 35 has an inner surface 38 which has a taper that is complementary to the taper of the shank 26 of the solid pin 25. The inner surface 38 of the sleeve 35, as seen in FIG. 1, has internal diameters at the extremities which are substantially the same as or slightly less than the external diameters of the shank 26 when the connecting pin 10 is assembled as depicted in FIGS. 1 and 2 of the drawings. The inner surface 38 of the sleeve 35 is shown having a taper of approximately six degrees, which is the taper of the shank 26 of solid pin 25 to achieve the complementary engagement depicted in FIG. 1 of the drawings.

The connecting pin 10 also includes a collar 45 which, in a manner similar to the head 27 of solid pin 25, extends radially outwardly of the pin 25 when in the assembled condition of FIG. 1 and radially beyond the sleeve 35 for abutting engagement thereto and a sufficient distance to overlie a portion of the outer surface of the leg 17 of the clevis 15. As shown, the collar 45 is a generally cylindrical member with a central throughbore 46 (FIG. 3).

The collar 45 cooperates with a fastener 50 to control the relative axial positioning of the sleeve 35 and the solid pin 25. As shown, the fastener 50 is a conventional bolt having threads 51 and a head 52. The threads 51 of fastener 50 extend through the throughbore 46 of collar 45 through a portion of sleeve 35 and into the bore 31 of solid pin 25 wherein the threads 32 therein are matingly engaged. The head 52 of fastener 50 may be provided with one or more pairs of diametrically oppositely disposed flats 53 for engagement by a conventional wrench.

In utilization, the connecting pin 10 is inserted in apertures 19 and 21 of machine elements such as the clevis 15 and cylinder eye 20 by inserting the sleeve 35 therein with the solid pin 25 positioned internally thereof, substantially as seen in FIG. 1 of the drawings. The collar 45 is then positioned abutting the axial extremity of the sleeve 35, and the fastener 50 is inserted through the throughbore 46 in collar 45 and threaded into bore 31 in solid pin 25. Rotation of the fastener 50 effects relative movement between the sleeve 35 and the solid pin 25 to secure connecting pin 10 in place. It is to be noted that the head 27 and collar 45 maintain the sleeve 35 and the entire connector pin 10 positioned substantially as shown in FIG. 1 relative to the machine elements 15, 20.

In many instances, it is necessary to rotate the fastener 50 merely to an extent of effecting a snug fit between the outer surface 36 of the sleeve 35 and the bores 19, 21. In such case, machine elements, such as the clevis 15 and the cylinder eye 20, would be free to rotate relative to each other. In some applications, it may be desirable to fix the sleeve 35 relative to one or both of the machine elements 15, 20. This can be accomplished by rotation of the fastener 50 relative to the solid pin 25 to effect a relative axial movement between sleeve 35 and solid pin 25 to an extent that the sleeve 35 is slightly radially expanded, which is made possible by the slot 37 therein. Thus, with judicious sizing, a locking of the pin 10 in an attachment opening of work pieces may be readily effectuated.

When desired at some future time, it is a simple matter to remove the connector pin 10, irrespective of corrosive action which may have taken place in regard to the connector pin 10 or the associated machine elements 15, 20. Initially, the fastener 50 is unthreaded from the solid pin 25, and the collar 45 is removed. If the solid pin is not readily removable from within the sleeve 35, it may be tapped lightly in the area of the face 30 to effect displacement of the solid pin 25 to the left as depicted in FIG. 1. In this respect, it is to be noted that the tapered outer surface 29 of the solid pin 25 facilitates release and removal of solid pin 25 relative to sleeve 35. The sleeve 35 is then removed from the bores 19, 21 in the machine elements 15, 20. Again, the axial extremities of the sleeve 35 may be lightly tapped if necessary to effect removal of sleeve 35. In this respect, it is to be noted that in the presence of extreme corrosive build-up between the sleeve 35 and the bores 19, 21, the slot 37 permits an extent of diametric contraction of the outer surface 36 of sleeve 35 to further facilitate removal of sleeve 35.

Figure 4:
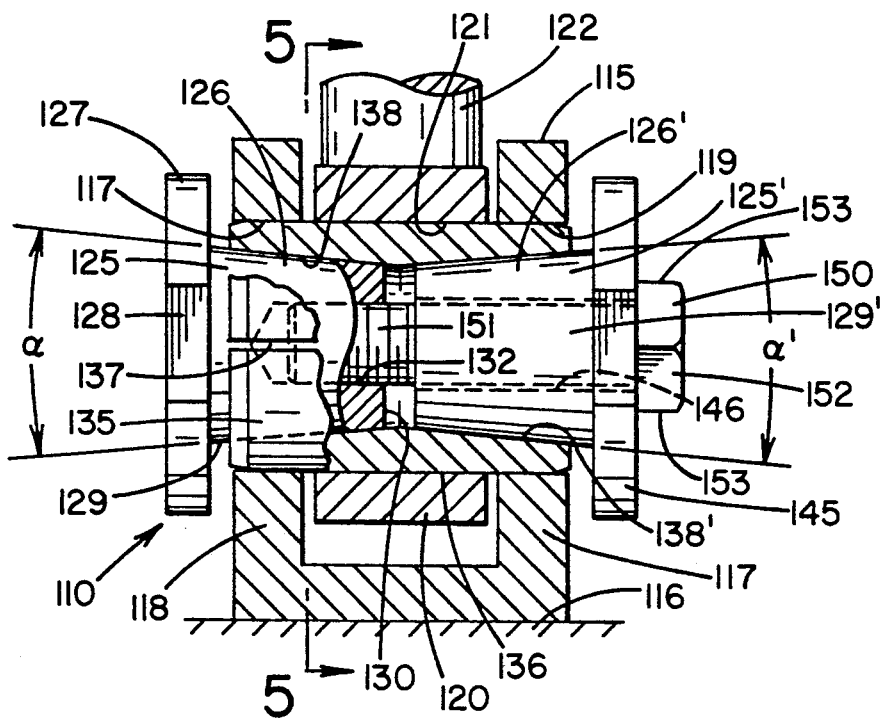
FIG. 4 is a front elevational view of an exemplary connecting pin showing a second embodiment of the concepts of the present invention, the view being similar to FIG. 1 in depicting the connecting pin with portions broken away and shown in section and illustrated in relation to a pair of machine elements having attachment apertures for receiving the connecting pin.

A connecting pin according to the concepts of the present invention for use in joining machine elements having attachment apertures and particularly the second embodiment thereof depicted in FIGS. 4–6 of the drawings is generally indicated by the numeral 110. The connecting pin 110 may be employed in conjunction with a wide variety of machine elements wherein each has an aperture, and the members interfit or can be placed in adjacent proximity such that when joined by connecting pin 110 the machine elements are temporarily interconnected to operate as a unitary member.

In the exemplary environment depicted in FIGS. 4–6 of the drawings, there is shown a conventional clevis 115 which may be affixed to other machine elements 116. As seen in FIGS. 4 and 5, the clevis 115 has spaced upstanding legs 117 and 118, with each of the legs being provided with an aperture in the form of a bore 119. As shown, the clevis 115 interrelates with a conventional cylinder eye 120 which has an aperture or bore 121 that is normally of substantially the same diameter as the bore 119 in legs 117, 118 of the clevis 115. As shown, the cylinder eye 120 is attached to a conventional cylinder rod 122, which might be part of a pneumatic or hydraulic cylinder.

The connecting pin 110 in the form depicted in FIGS. 4–6 of the drawings includes a radially centrally located solid pin 125 having shanks 126, 126', which are of a significantly lesser outside diameter than the diameter of the bores 119 and 121 of the legs 117, 118 and the cylinder eye 120, respectively. The shanks 126 are of a combined axial extent which is preferably substantially equal to or slightly greater than the distance between the outside surfaces of the legs 117, 118 of the clevis 115, as best seen in FIG. 4. As shown, the pin part 125 has an integrally formed head 127 which is preferably of a larger radial extent or diameter than the shank 126 and the bore 119 in the leg 118 such as to overlie a portion of the outer surface of a leg 118 of clevis 115, as depicted in FIG. 4 of the drawings. The head 127 may be provided with two or more diametrically disposed flats 128 for engagement by a conventional wrench. It will be appreciated by persons skilled in the art that in lieu of the head 127, the pin part 125 could be provided with a collar or other structure which is non-rotatably affixed to the shank 126 of pin part 125.

The axial extremity of the pin part 125 opposite the head 127 has a face 130 with an internal bore 131 which is provided with threads 132 for a purpose that will be detailed hereinafter. As appears from FIGS. 4 and 5 of the drawings, the shanks 126, 126' of the pin parts 125, 125' have a tapered outer surface 129, 129' over at least a portion of the axial extent thereof and preferably the entire axial extent as shown. The taper of shanks 126, 126' provides a progressively larger diameter from the proximate ends of the shanks 126, 126' as positioned in FIG. 1 in each axial direction. The taper of the shanks 126, 126' is preferably uniform and preferably approximately at included angles α, α' of substantially six degrees with respect to a cylindrical configuration. Depending upon the application and the configuration of the parts, the taper could vary by employing an included angles α, α' in the range of two to fifteen degrees, depending upon various design considerations which will be apparent to persons skilled in the art.

The connecting pin 110 also includes a sleeve 135 which is configured to over fit the pin parts 125, 125' as particularly shown in FIG. 4 of the drawings. The sleeve 135 has a cylindrical outer surface 136 which is sized to interfit within the bores 119 of legs 118 of the clevis 115 and the bore 121 in the cylinder eye 120. The sleeve 135 is circumferentially discontinuous over at least a portion of the axial length thereof and, as shown, may have a through slot 137 which extends the entire axial length thereof. The sleeve 135 has inner surfaces 138, 138' which have a taper that is complementary to the taper of the shanks 126, 126' of the pin parts 125, 125'. The inner surface of the sleeve 135, as seen in FIG. 1, has internal diameters at the extremities which are substantially the same as or slightly less than the external diameters of the shanks 126, 126' when the connecting pin 110 is assembled as depicted in FIGS. 4 and 5 of the drawings. The inner surface of the sleeve 135 is shown having reducing diameter tapers from each axial extremity of approximately six degrees, which is the taper of the shanks 126, 126' of the pin parts 125, 125' to achieve the complementary engagement depicted in FIG. 4 of the drawings.

The pin part 125' includes a separate or, as shown, an integral collar 145 which, in a manner similar to the head 127 of pin part 125, extends radially outwardly of the shank 126' of pin part 125' when in the assembled condition of FIG. 4 and radially beyond the sleeve 135 for abutting engagement thereto and a sufficient distance to overlie a portion of the outer surface of the leg 117 of the clevis 115. As shown, the collar 145 is a generally cylindrical member with a central throughbore 146 (FIG. 6) which extends the entire axial length of the pin part 125'.

A fastener 150 controls the relative axial positioning of the sleeve 135 and the pin parts 125, 125'. As shown, the fastener 150 is a conventional bolt having threads 151 and a head 152. The threads 151 of fastener 150 extend through the throughbore 146 of collar 145 through a portion of sleeve 135 and into the bore 131 of pin part 125 wherein the threads 132 therein are matingly engaged. The head 152 of fastener 150 may be provided with one or more pairs of diametrically oppositely disposed flats 153 for engagement by a conventional wrench.

In utilization, the connecting pin 110 is inserted in apertures 119 and 121 of machine elements such as the clevis 115 and cylinder eye 120 by inserting the sleeve 135 therein with the pin parts 125, 125' positioned internally thereof substantially as seen in FIG. 4 of the drawings. The fastener 150 is then inserted through the throughbore 146 in collar 145 and threaded into bore 131 in pin part 125. Rotation of the fastener 150 effects relative movement between the sleeve 135 and the pin parts 125, 125' to secure connecting pin 110 in place. It is to be noted that the head 127 and collar 145 maintain the sleeve 135 and the entire connector pin 110 positioned substantially as shown in FIG. 4 relative to the machine elements 115, 120.

In many instances, it is necessary to rotate the fastener 150 merely to an extent of effecting a snug fit between the outer surface 136 of the sleeve 135 and the bores 119, 121. In such case, machine elements, such as the clevis 115 and the cylinder eye 120, would be free to rotate relative to each other. In some applications, it may be desirable to fix the sleeve 135 relative to one or both of the machine elements 115, 120. This can be accomplished by rotation of the fastener 150 relative to the pin part 125 to effect relative axial movement between sleeve 135 and pin parts 125, 125' to an extent that the sleeve 135 is slightly radially expanded, which is made possible by the slot 137 therein. Thus, with judicious sizing, a locking of the pin 110 in an attachment opening of work pieces may be readily effectuated.

When desired at some future time, it is a simple matter to remove the connector pin 110, irrespective of corrosive action which may have taken place in regard to the connector pin 110 or the associated machine elements 115, 120. Initially, the fastener 150 is unthreaded from the pin part 125 and removed from pin part 125'. If the pin parts 125, 125' are not readily removable from within the sleeve 35, they may be tapped lightly in the area of the head 127 and the collar 145. In this respect, it is to be noted that the tapered outer surface of the pin parts 125, 125' facilitate release and removal from sleeve 135. The sleeve 135 is then removed from the bores 119, 121 in the machine elements 115, 120. Again, the axial extremities of the sleeve 135 may be lightly tapped if necessary to effect removal of sleeve 135. In this respect, it is to be noted that in the presence of extreme corrosive build-up between the sleeve 135 and the bores 119, 121, the slot 137 permits an extent of diametric contraction of the outer surface 136 of sleeve 135 to further facilitate removal of sleeve 135.

Inasmuch as the present invention in the two exemplary disclosed embodiments is subject to variations, modifications, and changes in detail, some of which have been expressly stated herein, it is intended that all matter described throughout this entire specification or shown in the accompanying drawings be interpreted as illustrative and not in a limiting sense. It should thus be evident that a device constructed according to the concept of the present invention, and reasonably equivalent thereto, will accomplish the objects of the present invention and otherwise substantially improve the art of connecting pins for temporarily joining machine elements having attachment apertures.

We claim:

1. A connector for joining a plurality of elements having attachment apertures therein comprising, pin means having radially extending head means and shank means extending axially from said head means positionable through all of the attachment apertures and having a tapering outer surface over at least a portion of the axial extent thereof, sleeve means insertable through all of the attachment apertures and having a tapering inner surface over at least a portion of the axial extent thereof for engaging said tapering outer surface of said pin means, a discontinuity in said sleeve means extending at least a portion of the axial extent thereof, and means for axially displacing said sleeve means relative to said pin means selectively to expand and to permit a reduction in the diameter of at least a portion of said sleeve means, wherein said means for axially displacing said sleeve means relative to said pin means includes collar means and fastener means extending through said collar means and threadably engaging said pin means.

2. A connector according to claim 1, wherein said head means and said collar means overlie a portion of the elements proximate to the attachment apertures.

3. A connector according to claim 1, wherein said tapering outer surface of said shank means extends substantially the entire axial extent thereof.

4. A connector according to claim 3, wherein said tapering outer surface of said shank means has a progressively smaller diameter from a position proximate said head means to the opposite axial extremity thereof.

5. A connector according to claim 1, wherein said tapering outer surface of said shank means has a progressively smaller diameter from the axial extremities thereof to an intermediate position.

6. A connector according to claim 5, wherein said tapering inner surface of said sleeve means has a progressively smaller diameter from the axial extremities thereof to an intermediate position.

7. A connector according to claim 1, wherein said head means of said pin means is formed integrally with said shank means.

8. A connector according to claim 7, wherein said pin means is formed in two parts and said means for axially displacing said sleeve means relative to said pin means includes fastener means extending through one of said two parts and engages a threaded bore in the other of said two parts.

9. A connector according to claim 1, wherein said discontinuity in said sleeve means is a through slot.

10. A connector according to claim 9, wherein said through slot extends the entire axial extent of said sleeve means.

11. A connecting pin for joining a pair of machine elements including a clevis with spaced legs having attachment apertures therein and a cylinder eye interposed between the spaced legs and having an attachment aperture therein comprising, pin means having radially extending head means, shank means on said pin means extending axially from said head means positionable through all of the attachment apertures and having a tapering outer surface axially thereof, sleeve means insertable through all of the attachment apertures and having a tapering inner surface axially thereof for engaging said tapering outer surface of said pin means, slot means in said sleeve means extending axially thereof, and fastener means extending through collar means and threadably engaging said pin means for axially relatively displacing said sleeve means and said pin means.

12. A connecting pin according to claim 11, wherein said head means and said collar means overlie a portion of the elements proximate to the attachment apertures.

13. A connecting pin according to claim 11, wherein said tapering outer surface of said shank means has a progressively smaller diameter from a position proximate said head means to the opposite axial extremity thereof.

14. A connecting pin according to claim 11, wherein said head means and said fastener means have flats to permit gripping by tools to facilitate relative rotation.

15. A connecting pin according to claim 11, wherein said collar means engages said sleeve means.

16. A connecting pin according to claim 11, wherein said collar means is attached to said pin means.

17. A connecting pin according to claim 11, wherein said radially extending head means and said collar means are larger than the attachment apertures in the spaced legs of the clevis and are positioned proximate thereto.

* * * * *